United States Patent
Huang et al.

(10) Patent No.: US 11,360,371 B2
(45) Date of Patent: Jun. 14, 2022

(54) LASER MIXING MODULE

(71) Applicant: QISDA CORPORATION, Taoyuan (TW)

(72) Inventors: Ching-Shuai Huang, Taoyuan (TW); Bing-Hann Leu, Taoyuan (TW); Chi-Hung Hsiao, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 17/195,588

(22) Filed: Mar. 8, 2021

(65) Prior Publication Data
US 2021/0294195 A1    Sep. 23, 2021

(30) Foreign Application Priority Data
Mar. 23, 2020 (CN) .......................... 202010209082.6

(51) Int. Cl.
*G03B 21/20* (2006.01)
*G03B 21/14* (2006.01)

(52) U.S. Cl.
CPC ....... *G03B 21/2033* (2013.01); *G03B 21/142* (2013.01); *G03B 21/2073* (2013.01)

(58) Field of Classification Search
CPC .............. G03B 21/2033; G03B 21/142; G03B 21/2073
USPC ......................................................... 353/20
See application file for complete search history.

(56) References Cited

U.S. PATENT DOCUMENTS

| | | | |
|---|---|---|---|
| 9,261,770 B2 | 2/2016 | Janssens | |
| 11,067,885 B2 | 7/2021 | D'Oosterlinck | |
| 2004/0032736 A1 | 2/2004 | Huang | |
| 2014/0092364 A1* | 4/2014 | Janssens | F21V 13/00 353/8 |
| 2017/0115554 A1* | 4/2017 | D'Oosterlinck | G02B 27/14 |

FOREIGN PATENT DOCUMENTS

| | | | |
|---|---|---|---|
| CN | 103597816 A | 2/2014 | |
| CN | 106165412 A | 11/2016 | |
| WO | WO-2012063322 A1 * | 5/2012 | .............. F21V 13/02 |

* cited by examiner

*Primary Examiner* — Jerry L Brooks

(57) ABSTRACT

A laser mixing module includes first, second, and third laser sets and a condensing lens. The first laser set includes first and second laser sources and a first polarization beam splitter reflecting a polarization light of the first laser source and allowing a polarization light of the second laser source to pass for forming a first laser beam. The second laser set includes third and fourth laser sources and a second polarization beam splitter reflecting a polarization light of the third laser source and allowing a polarization light of the fourth laser source to pass therethrough for forming a second laser beam. The third laser set includes a fifth laser source and first and second dichroic mirrors respectively reflecting the first and second laser beams and allowing a light of the fifth laser source to pass for forming a third laser beam. The condensing lens condenses the third laser beam.

8 Claims, 3 Drawing Sheets

LASER MIXING MODULE

BACKGROUND OF THE INVENTION

1. Field of the Invention

The present invention relates to a laser mixing module, and more specifically, to a laser mixing module utilizing polarization beam splitters for mixing of polarization light to reduce the overall volume of the laser mixing module.

2. Description of the Prior Art

In general, a laser projection apparatus uses a light mixing module to form a laser beam for image projection. The prior art design involves disposing a plurality of reflection mirrors in an alternate arrangement and inclining the reflection mirrors relative to a plurality of laser sources emitting different color lights (e.g. RGB laser sources). In this design, some laser sources aims at the plurality of reflection mirrors, and the other laser sources are arranged alternately with the plurality of reflection mirrors. Accordingly, light of the laser sources aiming at the reflection mirrors can be reflected by the reflection mirrors. On the other hand, light of the laser sources alternately arranged with the reflection mirrors is not reflected by the reflection mirrors, meaning that the light can pass through a gap between the two adjacent reflection mirrors or pass by the reflection mirror). As such, the light not reflected by the reflection mirrors can be mixed with the light reflected by the reflection mirrors to form a laser beam, and then the laser beam is incident to a condensing lens for image projection.

However, as mentioned above, since the reflection mirrors are required to be spaced with regular intervals, some laser sources need to aims at the reflection mirrors respectively, and the other laser sources and the reflection mirrors are disposed to have an alternate arrangement, the overall volume of the light mixing module cannot be further reduced, so as to be disadvantageous to the thinning design of the laser projection apparatus.

SUMMARY OF THE INVENTION

The present invention provides a laser mixing module applied to providing a laser beam to a laser projection apparatus. The laser mixing module includes a first laser set, a second laser set, a third laser set, and a condensing lens. The first laser set includes a first laser source, a second laser source, and a first polarization beam splitter. The first laser source emits a first polarization light along a first optical axis. The second laser source emits a second polarization light along a second optical axis. The first polarization light and the second polarization light have different polarizations. Wavelengths of the first polarization light and the second polarization light are within a first waveband. The first optical axis intersects the second optical axis. The first polarization beam splitter is obliquely disposed at a position where the first optical axis intersects the second optical axis for reflecting the first polarization light and allowing the second polarization light to pass therethrough for mixing the second polarization light with the first polarization light to form a first laser beam. The second laser set includes a third laser source, a fourth laser source, and a second polarization beam splitter. The third laser source emits a third polarization light along a third optical axis. The fourth laser source emits a fourth polarization light along a fourth optical axis. The third polarization light and the fourth polarization light have different polarizations. Wavelengths of the third polarization light and the fourth polarization light are within a second waveband. The third optical axis intersects the fourth optical axis. The second polarization beam splitter is obliquely disposed at a position where the third optical axis intersects the fourth optical axis for reflecting the third polarization light and allowing the fourth polarization light to pass therethrough for mixing the fourth polarization light with the third polarization light to form a second laser beam. The third laser set includes a fifth laser source, a first dichroic mirror, and a second dichroic mirror. The fifth laser source emits a laser light along a fifth optical axis. A wavelength of the laser light is within a third waveband. The fifth optical axis intersects the second optical axis and the fourth optical axis. The first waveband, the second waveband and the third waveband are different from each other. The first dichroic mirror is obliquely disposed at a position where the second optical axis intersects the fifth optical axis for reflecting the first laser beam and allowing the laser light to pass therethrough. The second dichroic mirror is obliquely disposed at a position where the fourth optical axis intersects the fifth optical axis for reflecting the second laser beam and allowing the laser light to pass therethrough for mixing the first laser beam with the second laser beam and the laser light to form a third laser beam. The condensing lens is disposed at the fifth optical axis for condensing the third laser beam.

The present invention further provides a laser mixing module applied to providing a laser beam to a laser projection apparatus. The laser mixing module includes a first laser set, a second laser set, a first reflection mirror, a second reflection mirror, and a condensing lens. The first laser set includes a first laser source, a second laser source, and a first polarization beam splitter. The first laser source emits a first polarization light along a first optical axis. The second laser source emits a second polarization light along a second optical axis. The first polarization light and the second polarization light have different polarizations. Wavelengths of the first polarization light and the second polarization light are within a first waveband. The first optical axis intersects the second optical axis. The first polarization beam splitter is obliquely disposed at a position where the first optical axis intersects the second optical axis for reflecting the first polarization light and allowing the second polarization light to pass therethrough for mixing the second polarization light with the first polarization light to form a first laser beam. The second laser set includes a third laser source, a fourth laser source, and a second polarization beam splitter. The third laser source emits a third polarization light along a third optical axis. The fourth laser source emits a fourth polarization light along a fourth optical axis. The third polarization light and the fourth polarization light have different polarizations. A wavelength of the third polarization light is within a second waveband. A wavelength of the fourth polarization light is within a third waveband. The third optical axis intersects the fourth optical axis. The first waveband, the second waveband and the third waveband are different from each other. The second polarization beam splitter is obliquely disposed at a position where the third optical axis intersects the fourth optical axis for reflecting the third polarization light and allowing the fourth polarization light to pass therethrough for mixing the fourth polarization light with the third polarization light to form a second laser beam. The first reflection mirror and the second reflection mirror are obliquely disposed at the fifth optical axis to reflect the first laser beam and the second laser beam respectively for mixing the first laser beam with the second laser beam to form a third laser beam. The fifth optical axis intersects the second optical axis and the fourth optical axis respectively. The condensing lens is disposed at the fifth optical axis for condensing the third laser beam.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
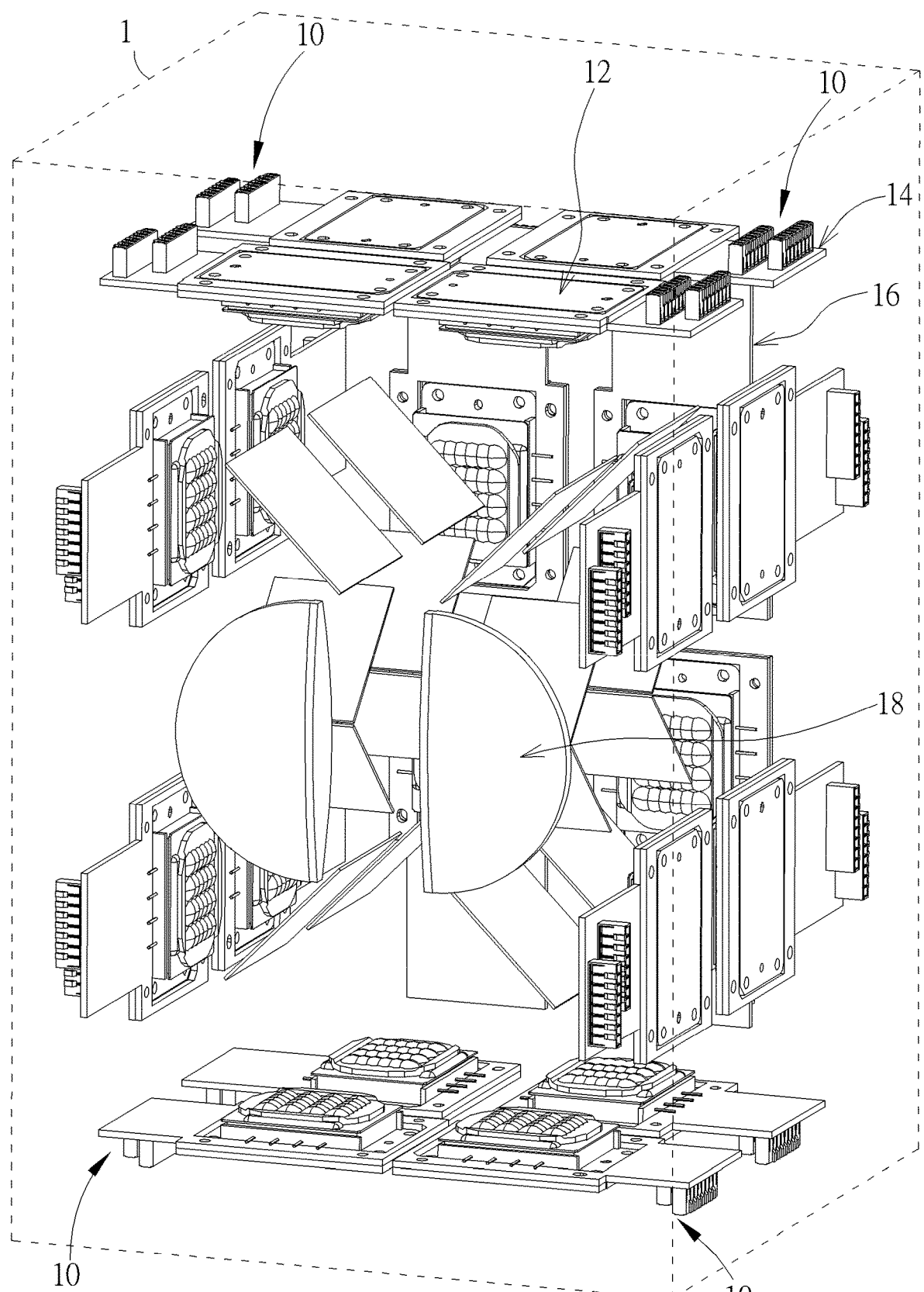
FIG. 1 is a diagram of a laser projection apparatus according to an embodiment of the present invention.

Please refer to FIG. 1, which is a diagram of a laser projection apparatus 1 according to an embodiment of the present invention. For clearly showing the optical component configuration of a laser mixing module 10 provided by the present invention, components (e.g. a projector casing, a light guide module, an imaging module, a projection module, etc.) of the laser projection module 1, except the laser mixing module 10, are briefly depicted by a dotted-line box, and the related description is omitted herein since it is commonly seen in the prior art. As shown in FIG. 1, the laser mixing module 10 is applied to providing a laser beam to the laser projection apparatus 1 for image projection. The laser mixing module 10 includes a first laser set 12, a second laser set 14, a third laser set 16, and a condensing lens 18. In this embodiment, the present invention adopts the design that four laser mixing modules 10 are arranged vertically and horizontally in the laser projection apparatus 1 as shown in FIG. 1, but not limited thereto, meaning that the number and arrangement of the laser mixing modules 10 could be adjustable according to the practical application of the present invention. More detailed description for the laser mixing module 10 located at an upper right corner in FIG. 1 is provided as follows. As for the related description for the other laser mixing modules 10, it could be reasoned by analogy according to the following description and omitted herein.

Figure 2:
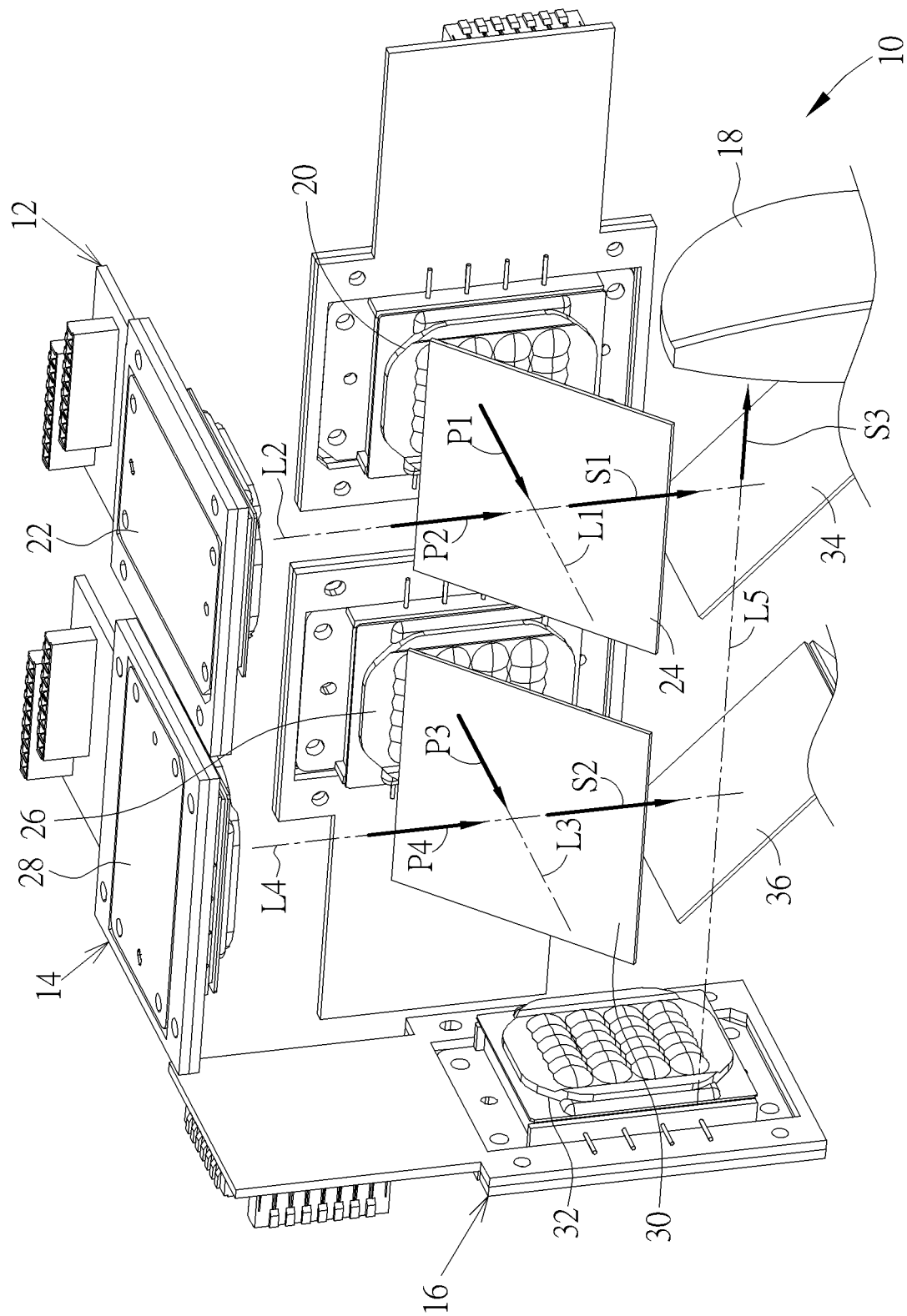
FIG. 2 is an enlarged diagram of a laser mixing module located at an upper right corner in FIG. 1.

Please refer to FIG. 1 and FIG. 2. FIG. 2 is an enlarged diagram of the laser mixing module 10 located at the upper right corner in FIG. 1. As shown in FIG. 1 and FIG. 2, the first laser set 12 includes a first laser source 20, a second laser source 22, and a first polarization beam splitter 24. The first laser source 20 emits a first polarization light P1 along a first optical axis L1, and the second laser source 22 emits a second polarization light P2 along a second optical axis L2. The first laser source 20 and the second laser source 22 could be preferably a red laser diode (but not limited thereto, meaning that the type of laser source could depend on the practical application of the laser projection apparatus 1). The first polarization light P1 and the second polarization light P2 have different polarizations and could be a polarization light commonly seen in the prior art, such as P-polarization light or S-polarization light. Wavelengths of the first polarization light P1 and the second polarization light P2 are within a first waveband (preferably a red-light waveband). The first optical axis L1 intersects the second optical axis L2, and the first polarization beam splitter 24 is obliquely disposed at a position where the first optical axis L1 intersects the second optical axis L2 for reflecting the first polarization light P1 and allowing the second polarization light P2 to pass therethrough, so as to mix the second polarization light P2 with the first polarization light P1 to form a first laser beam S1.

The second laser set 14 includes a third laser source 26, a fourth laser source 28, and a second polarization beam splitter 30. The third laser source 26 emits a third polarization light P3 along a third optical axis L3, and the fourth laser source 28 emits a fourth polarization light P4 along a fourth optical axis L4. The third laser source 26 and the fourth laser source 28 could be preferably a green laser diode (but not limited thereto, meaning that the type of laser source could depend on the practical application of the laser projection apparatus 1). The third polarization light P3 and the fourth polarization light P4 have different polarizations and could be a polarization light commonly seen in the prior art, such as P-polarization light or S-polarization light. Wavelengths of the third polarization light P3 and the fourth polarization light P4 are within a second waveband (preferably a green-light waveband). The third optical axis L3 intersects the fourth optical axis L4, and the second polarization beam splitter 30 is obliquely disposed at a position where the third optical axis L3 intersects the fourth optical axis L4 for reflecting the third polarization light P3 and allowing the fourth polarization light P4 to pass therethrough, so as to mix the fourth polarization light P4 with the third polarization light P3 to form a second laser beam S2.

The third laser set 16 includes a fifth laser source 32, a first dichroic mirror 34, and a second dichroic mirror 36. The fifth laser source 32 emits a laser light along a fifth optical axis L5. The fifth laser source 32 could be preferably a blue laser diode (but not limited thereto, meaning that the type of laser source could depend on the practical application of the laser projection apparatus 1). A wavelength of the laser light of the fifth laser source 32 is within a third waveband (preferably a blue-light waveband) different from the first and second wavebands. The fifth optical axis L5 intersects the second optical axis L2 and the fourth optical axis L4. The first dichroic mirror 34 is obliquely disposed at a position where the second optical axis L2 intersects the fifth optical axis L5 for reflecting the first laser beam S1 and allowing the laser light of the fifth laser source 32 to pass therethrough, and the second dichroic mirror 36 is obliquely disposed at a position where the fourth optical axis L4 intersects the fifth optical axis L5 for reflecting the second laser beam S2 and allowing the laser light of the fifth laser source 32 to pass therethrough. Accordingly, as shown in FIG. 2, the first laser beam S1 can be mixed with the second laser beam S2 and the laser light of the fifth laser source 32 to cooperatively form a third laser beam S3. The condensing lens 18 is disposed at the fifth optical axis L5 to condense the third laser beam S3 for image projection of the laser projection apparatus 1.

In practical application, as shown in FIG. 2, a plane defined by the first optical axis L1 and the second optical axis L2 could be preferably close to the condensing lens 18, and a plane defined by the third optical axis L3 and the fourth optical axis L4 could be preferably away from the condensing lens 18. Furthermore, the second optical axis L2 and the fourth optical axis L4 could be preferably perpendicular to the first optical axis L1, the third optical axis L3 and the fifth optical axis L5. Oblique angles of the first polarization beam splitter 24 respectively relative to the first laser source 20 and the second laser source 22, oblique angles of the second polarization beam splitter 30 respectively relative to the third laser source 26 and the fourth laser source 28, oblique angles of the first dichroic mirror 34 respectively relative to the second laser source 22 and the fifth laser source 32, and oblique angles of the second dichroic mirror 36 respectively relative to the fourth laser source 28 and the fifth laser source 32 could be preferably equal to 45°, but the present invention is not limited thereto.

Compared with the prior art adopting the design that some laser sources aim at the reflection mirrors and the other laser sources and the reflection mirrors are disposed to have an alternate arrangement, the present invention adopts the aforesaid beam splitter configuration for mixing the polarization lights of the laser sources. In such a manner, since the present invention is not limited to the prior art design that the laser sources and the reflection mirrors needs to be disposed in an alternate arrangement, the present invention can minimize a gap between any two adjacent laser sources for efficiently reducing the overall volume of the laser mixing module and simplifying the configuration of the optical components in the laser mixing module, so as to be advantageous to the thinning design of the laser projection apparatus.

Figure 3:
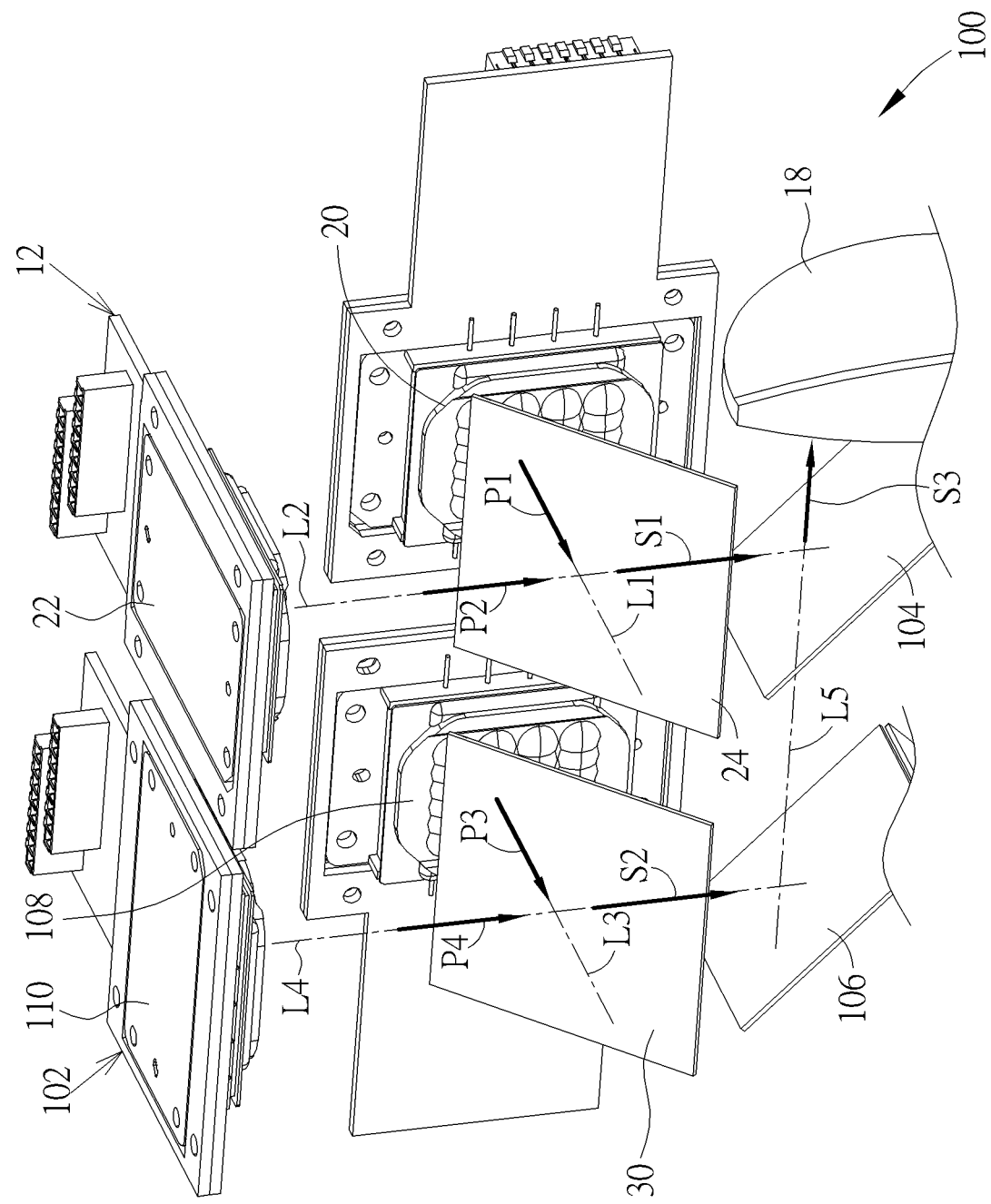
FIG. 3 is a partial enlarged diagram of a laser mixing module according to another embodiment of the present invention.

It should be mentioned that the configuration of the laser sources is not limited to the aforesaid embodiment. For example, please refer to FIG. 3, which is a partial enlarged diagram of a laser mixing module 100 according to another embodiment of the present invention. Components both mentioned in this embodiment and the aforesaid embodiment represent components with similar structures or functions, and the related description is omitted herein. As shown in FIG. 3, the laser mixing module 100 is applied to providing a laser beam to a laser projection apparatus for image projection. The laser mixing module 100 includes the first laser set 12, a second laser set 102, a first reflection mirror 104, a second reflection mirror 106, and the condensing lens 18. The second laser set 102 includes a third laser source 108, a fourth laser source 110, and the second polarization beam splitter 30. The third laser source 108 emits the third polarization light P3 along the third optical axis L3, and the fourth laser source 110 emits the fourth polarization light P4 along the fourth optical axis L4. The third laser source 108 could be preferably a green laser diode and the fourth laser source 110 could be preferably a blue laser diode (but not limited thereto, meaning that the type of laser source could depend on the practical application of the laser mixing module 100). The third polarization light P3 and the fourth polarization light P4 have different polarizations and could be a polarization light commonly seen in the prior art, such as P-polarization light or S-polarization light. The wavelengths of the third polarization light P3 (could be preferably within a green-light waveband) and the fourth polarization light P4 (could be preferably within a blue-light waveband) are within different wavebands. The first reflection mirror 104 and the second reflection mirror 106 are obliquely disposed at the fifth optical axis L5, and oblique angles of the first reflection mirror 104 and the second reflection mirror 106 respectively relative to the condensing lens 18 could be preferably equal to 45° (but not limited thereto). Accordingly, the first reflection mirror 104 and the second reflection mirror 106 can be utilized to reflect the first laser beam S1 and the second laser beam S2 respectively, so that the first laser beam S1 can be mixed with the second laser beam S2 to cooperatively form the third laser beam S3 and the condensing lens 18 can condense the third laser beam S3 for image projection of the laser projection apparatus. Via the aforesaid design of omitting the third laser set, the present invention can further reduce the overall volume of the laser mixing module and simplify the configuration of the optical components in the laser mixing module, so as to be advantageous to the thinning design of the laser projection apparatus.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A laser mixing module applied to providing a laser beam to a laser projection apparatus, the laser mixing module comprising:
   a first laser set comprising:
      a first laser source emitting a first polarization light along a first optical axis;
      a second laser source emitting a second polarization light along a second optical axis, the first polarization light and the second polarization light having different polarizations, wavelengths of the first polarization light and the second polarization light being within a first waveband, the first optical axis intersecting the second optical axis; and
      a first polarization beam splitter obliquely disposed at a position where the first optical axis intersects the second optical axis for reflecting the first polarization light and allowing the second polarization light to pass therethrough for mixing the second polarization light with the first polarization light to form a first laser beam;
   a second laser set comprising:
      a third laser source emitting a third polarization light along a third optical axis;
      a fourth laser source emitting a fourth polarization light along a fourth optical axis, the third polarization light and the fourth polarization light having different polarizations, wavelengths of the third polarization light and the fourth polarization light being within a second waveband, the third optical axis intersecting the fourth optical axis; and
      a second polarization beam splitter obliquely disposed at a position where the third optical axis intersects the fourth optical axis for reflecting the third polarization light and allowing the fourth polarization light to pass therethrough for mixing the fourth polarization light with the third polarization light to form a second laser beam;
   a third laser set comprising:
      a fifth laser source emitting a laser light along a fifth optical axis, a wavelength of the laser light being within a third waveband, the fifth optical axis intersecting the second optical axis and the fourth optical axis, the first waveband, the second waveband and the third waveband being different from each other;
      a first dichroic mirror obliquely disposed at a position where the second optical axis intersects the fifth optical axis for reflecting the first laser beam and allowing the laser light to pass therethrough; and
      a second dichroic mirror obliquely disposed at a position where the fourth optical axis intersects the fifth optical axis for reflecting the second laser beam and allowing the laser light to pass therethrough for mixing the first laser beam with the second laser beam and the laser light to form a third laser beam; and a condensing lens disposed at the fifth optical axis for condensing the third laser beam, a plane defined by the first optical axis and the second optical axis being close to the condensing lens in the fifth optical axis, and a plane defined by the third optical axis and the fourth optical axis being away from the condensing lens in the fifth optical axis.

2. The laser mixing module of claim 1, wherein the first waveband is a red-light waveband, the second waveband is a green-light waveband of, and the third waveband is a blue-light waveband.

3. The laser mixing module of claim 1, wherein the second optical axis and the fourth optical axis are perpendicular to the first optical axis, the third optical axis, and the fifth optical axis.

4. The laser mixing module of claim 1, wherein oblique angles of the first polarization beam splitter respectively relative to the first laser source and the second laser source, oblique angles of the second polarization beam splitter respectively relative to the third laser source and the fourth laser source, oblique angles of the first dichroic mirror respectively relative to the second laser source and the fifth laser source, and oblique angles of the second dichroic mirror respectively relative to the fourth laser source and the fifth laser source are equal to 45°.

5. A laser mixing module applied to providing a laser beam to a laser projection apparatus, the laser mixing module comprising:
a first laser set comprising:
a first laser source emitting a first polarization light along a first optical axis;
a second laser source emitting a second polarization light along a second optical axis, the first polarization light and the second polarization light having different polarizations, wavelengths of the first polarization light and the second polarization light being within a first waveband, the first optical axis intersecting the second optical axis; and
a first polarization beam splitter obliquely disposed at a position where the first optical axis intersects the second optical axis for reflecting the first polarization light and allowing the second polarization light to pass therethrough for mixing the second polarization light with the first polarization light to form a first laser beam;
a second laser set comprising:
a third laser source emitting a third polarization light along a third optical axis;
a fourth laser source emitting a fourth polarization light along a fourth optical axis, the third polarization light and the fourth polarization light having different polarizations, a wavelength of the third polarization light being within a second waveband, a wavelength of the fourth polarization light being within a third waveband, the third optical axis intersecting the fourth optical axis, the first waveband, the second waveband and the third waveband being different from each other; and
a second polarization beam splitter obliquely disposed at a position where the third optical axis intersects the fourth optical axis for reflecting the third polarization light and allowing the fourth polarization light to pass therethrough for mixing the fourth polarization light with the third polarization light to form a second laser beam;
a first reflection mirror and a second reflection mirror obliquely disposed at the fifth optical axis to reflect the first laser beam and the second laser beam respectively for mixing the first laser beam with the second laser beam to form a third laser beam, the fifth optical axis intersecting the second optical axis and the fourth optical axis respectively; and
a condensing lens disposed at the fifth optical axis for condensing the third laser beam, a plane defined by the first optical axis and the second optical axis being close to the condensing lens in the fifth optical axis, and a plane defined by the third optical axis and the fourth optical axis being away from the condensing lens in the fifth optical axis.

6. The laser mixing module of claim 5, wherein the first waveband is a red-light waveband, the second waveband is a blue-light waveband, and the third waveband is a green-light waveband.

7. The laser mixing module of claim 5, wherein the second optical axis and the fourth optical axis are perpendicular to the first optical axis, the third optical axis, and the fifth optical axis.

8. The laser mixing module of claim 5, wherein oblique angles of the first polarization beam splitter respectively relative to the first laser source and the second laser source, oblique angles of the second polarization beam splitter respectively relative to the third laser source and the fourth laser source, and oblique angles of the first reflection mirror and the second reflection mirror relative to the condensing lens respectively are equal to 45°.

* * * * *